United States Patent
DeLuga

(10) Patent No.: US 6,813,145 B2
(45) Date of Patent: Nov. 2, 2004

(54) MULTISTAGE UNDOCKING ASSEMBLY AND SYSTEM AND METHOD INCORPORATING SAME

(75) Inventor: Ronald E. DeLuga, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/454,048

(22) Filed: Jun. 4, 2003

(65) Prior Publication Data

US 2004/0052036 A1 Mar. 18, 2004

Related U.S. Application Data

(62) Division of application No. 10/244,214, filed on Sep. 16, 2002.

(51) Int. Cl.[7] .................................................. H05K 7/00
(52) U.S. Cl. ..................... 361/679; 361/683; 361/684; 361/685; 439/928.1
(58) Field of Search ............................... 361/679, 686, 361/683, 685, 727; 439/928.1, 131, 310

(56) References Cited

U.S. PATENT DOCUMENTS 5,535,093 A * 7/1996 Noguchi et al. ............ 361/686
6,151,218 A * 11/2000 Pirdy et al. ................. 361/727
6,510,051 B2 * 1/2003 Kim ........................... 361/686

OTHER PUBLICATIONS

Docking station for portable computer and docking structure thereof, Usui et al., Pub No. US 2001/0030851 A1 and Pub date: Oct. 18, 2001.*

* cited by examiner

*Primary Examiner*—Randy W. Gibson
*Assistant Examiner*—Hung S. Bui

(57) ABSTRACT

The present technique provides a multistage undocking mechanism for a system having a portable computing device dockable with a docking device. The multistage undocking mechanism may be disposed in either the portable computing device or the docking device. In a first stage, the multistage undocking mechanism engages a latch assembly to unlatch the portable computing device from the docking device. In a second stage, the multistage undocking mechanism engages a lifter assembly to separate the portable computing device from the docking device at least partially via a manual force applied by the user. The lifter assembly may have one or more spring-loaded lifter mechanisms, such as a spring-loaded lifter having sufficient force to support the portable computing device but insufficient to separate male/female connections between the portable computing device and the docking device.

30 Claims, 4 Drawing Sheets

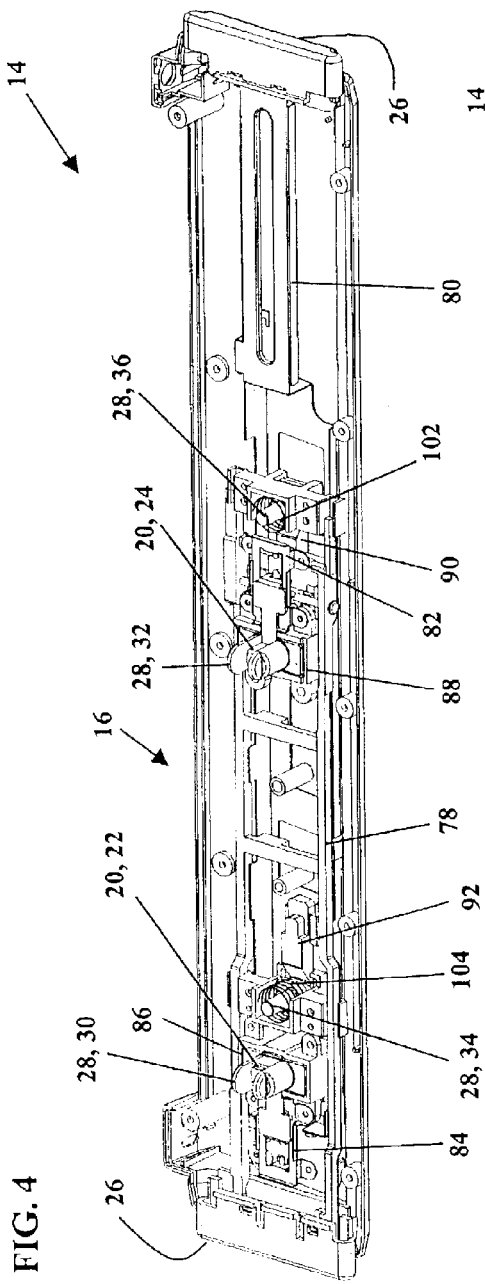

MULTISTAGE UNDOCKING ASSEMBLY AND SYSTEM AND METHOD INCORPORATING SAME

This is a divisional of copending application Ser. No. 10/244,214 filed on Sep. 16, 2002, which is hereby incorporated by reference herein.

FIELD OF THE INVENTION

The present technique relates generally to computer systems and, more particularly, to docking stations for a portable computer. The present technique provides a multistage undocking assembly, which reduces the spring force and smoothens the ejection of the portable computer from the docking station.

BACKGROUND OF THE INVENTION

This section is intended to introduce the reader to various aspects of art, which may be related to various aspects of the present invention described and/or claimed below. The discussion is believed to be helpful in providing the reader with background information to facilitate a better understanding of the various aspects of the present invention. Accordingly, it should be understood that these statements are to be read in this light, and not as admissions of prior art.

Portable electronic devices, such as laptop computers, are often coupled to a docking station having a variety of communication ports and expansion components. Existing docking stations often have one-stage undocking mechanisms, such as one-stage spring-loaded eject mechanisms, which may be triggered to release and separate the portable electronic device from the docking station. In this one-stage technique, the undocking mechanism must provide sufficient force to overcome the weight of the portable electronic device and various retaining forces holding the portable electronic device to the docking station. For example, each pair of male and female connectors, e.g., communication connectors, may require a considerable amount of force to overcome frictional forces, compressive forces, and various other retaining forces. Accordingly, existing one-stage undocking mechanisms may apply forces of a magnitude far exceeding the weight of the portable electronic device, thereby creating a relatively abrupt and noisy separation of the portable electronic device from the docking station.

Also, many docking stations are designed to accommodate a variety of laptop computers. Therefore, the one-stage undocking mechanisms used in these docking stations include spring-loaded eject mechanisms having a spring force sufficient to accommodate each of the potential laptop computers. Because the weights and retaining forces of docking connectors may vary widely between the different types and configurations of laptop computers, the spring-loaded eject mechanism generally has a high spring force sufficient for all expected configurations. In operation, the spring-loaded eject mechanism moves roughly due to frictional forces created by the high spring force. The spring-loaded eject mechanism also may abruptly eject certain types of laptop computers due to the high spring force, which may far exceed the force required for the weight of the laptop computer.

BRIEF DESCRIPTION OF THE DRAWINGS

Exemplary embodiments will hereafter be described with reference to the accompanying drawings, wherein like reference numerals denote like elements, and:

FIGS. 4 and 5 are partial internal perspective views of the attachable expansion device of FIGS. 1–3 further illustrating the multistage undocking assembly.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present technique provides a multistage undocking mechanism for a system having a portable computing device dockable with a docking device. The multistage undocking mechanism may be disposed in either the portable computing device or the docking device. In a first stage, the multistage undocking mechanism engages a latch assembly to unlatch the portable computing device from the docking device. In a second stage, the multistage undocking mechanism engages a lifter assembly to separate the portable computing device from the docking device at least partially via a manual force applied by the user. The lifter assembly may have one or more spring-loaded lifter mechanisms, such as a spring-loaded lifter having sufficient force to support the portable computing device but insufficient to separate male/female connections between the portable computing device and the docking device.

Figure 1:
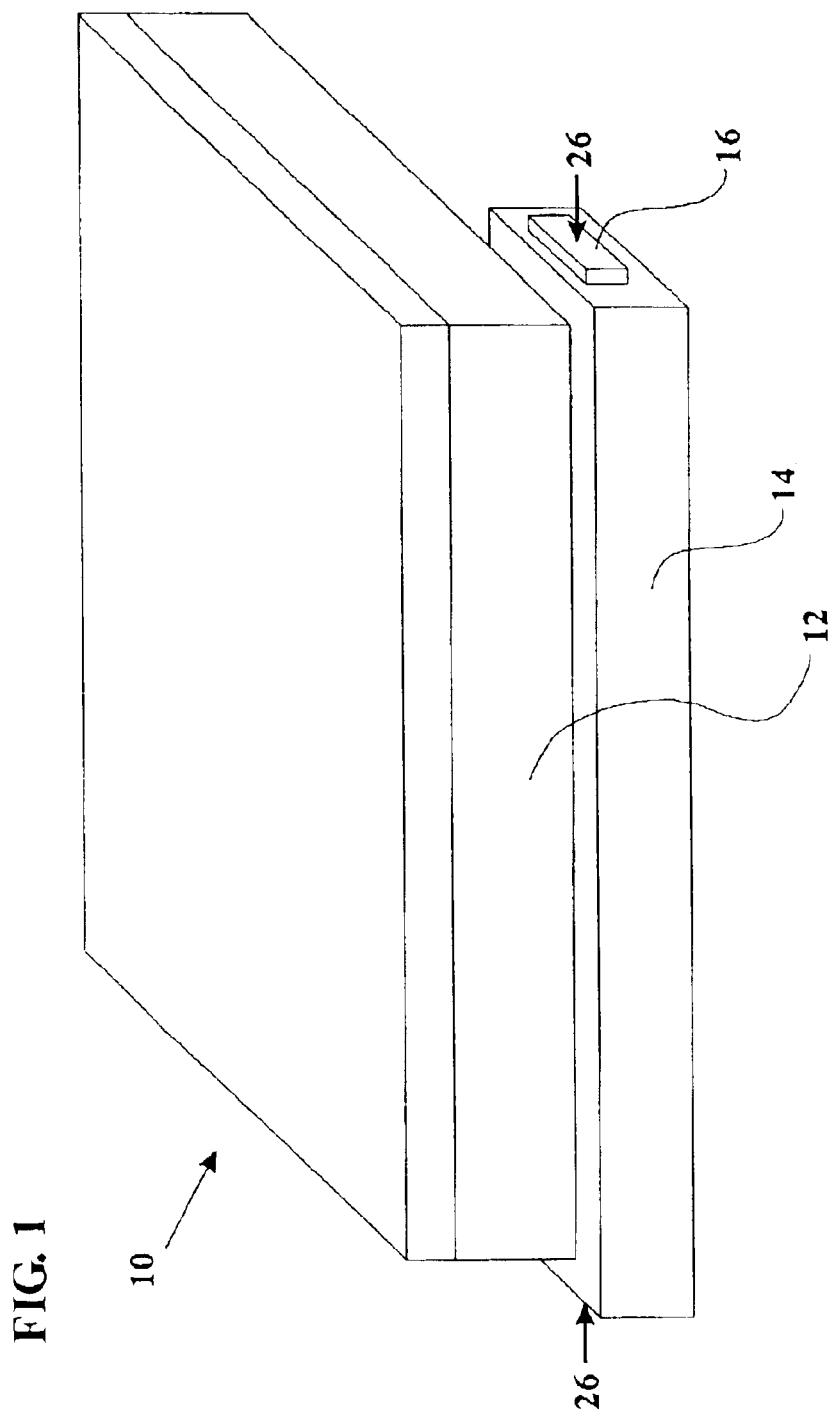
FIG. 1 is a perspective view of a portable computing device docked to an attachable expansion device having an exemplary multistage undocking assembly of the present technique.

The present technique provides a multistage undocking assembly, which has an unlatching stage and a separation stage. Certain aspects of the present technique have been incorporated into a computer system 10, which comprises a portable computing device 12 dockable with an attachable expansion device 14, as illustrated in FIG. 1. The portable computing device 12 may be a notebook computer, a laptop computer, a handheld/palm computer, a tablet computer, or any other dockable portable device. Accordingly, the portable computing device 12 may comprise a variety of computing components, such as a motherboard, one or more processors, random access memory (RAM), one or more hard disk drives, a floppy disk drive, a CD/DVD drive, a network card, a modem, a keyboard, a pointing device (e.g., a touch pad), communication ports, a display screen, and a variety of other circuitry and components. The attachable expansion device 14 may be a port replicator, a docking station, or any other such docking device having a variety of expansion components. For example, the attachable expansion device 14 may include communication ports, PCMCIA card slots, network support, and various other circuitry and components.

Figure 2:
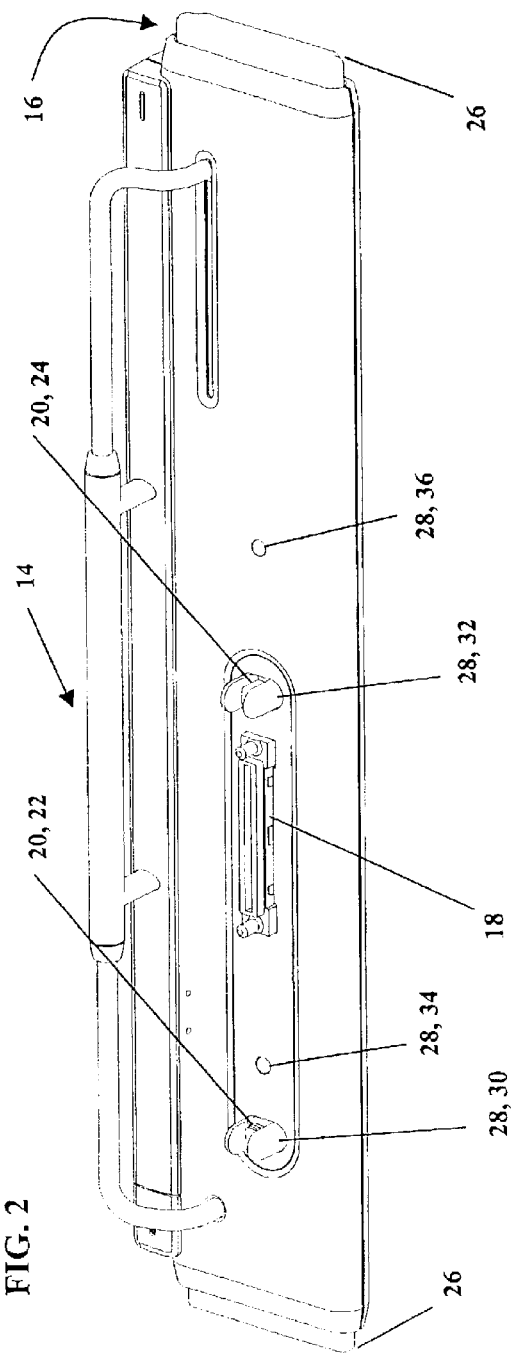
FIG. 2 is a rear perspective view of the attachable expansion of FIG. 1.

As discussed in further detail below, the portable computing device 12 is undockable from the attachable expansion device 14 via a multistage undocking assembly 16. FIG. 2 is a top perspective view of the attachable expansion device 14 illustrating an exemplary embodiment of the multistage undocking assembly 16. As illustrated, the attachable expansion device 14 comprises a communication port 18 coupleable with a mateable communication port on the portable computing device 12. In a docked position, as illustrated in FIG. 1, the communication port 18 and mateable communication port may be removably secured together via a retaining force, such as a compressive fit or frictional force between the mated ports. For example, a frictional or compressive force may exist at each electrical contact between the mated ports. The attachable expansion device 14 also has a mechanical attachment assembly 20, which is removably securable with a mateable latch assembly on the portable computing device 12. Although any suitable releasable attachment mechanism is within the scope of the present technique, the mechanical attachment assembly 20 has a pair of latch assemblies 22 and 24 movable between latched and unlatched positions.

As noted above, the multistage undocking assembly 16 facilitates unlatching and separation of the portable computing device 12 from the attachable expansion device 14 in different stages. As illustrated in FIG. 2, the multistage undocking assembly 16 has an engagement mechanism or trigger 26 (e.g., buttons) operably coupled to a device separation mechanism 28, which comprises a pair of spring-loaded lifters 30 and 32 and manually forced lifters 34 and 36. In the illustrated embodiment, the spring-loaded lifters 30 and 32 are disposed in a releasable relationship with the respective latch assemblies 22 and 24, while the manually forced lifters 34 and 36 are disposed apart from the respective latch assemblies 22 and 24. However, the device separation mechanism 28 may have any suitable number, type, and configuration of spring-loaded and/or manually forced lifter mechanisms, which may comprise a plurality of separate members or an integral assembly. For example, the device separation mechanism 28 may comprise a solenoid, a hydraulic assembly, a motor-driven geared assembly, or any other mechanism suitable for multi-stage unlatching and separation of the portable computing device 12 from the attachable expansion device 14.

In an undocked configuration of the attachable expansion device 14, the latch assemblies 22 and 24 are disposed in the unlatched position, wherein the spring-loaded lifters 30 and 32 are released from the respective latch assemblies 22 and 24 and are expanded to a springably lifted position. The manually forced lifters 34 and 36 are unengaged in this unlatched position. As the portable computing device 12 is lowered onto the attachable expansion device 14, the communication port 18 engages the mateable communication port and the spring-loaded lifters 30 and 32 compress downwardly toward a docked position. At the docked position, the spring-loaded lifters 30 and 32 release the respective latch assemblies 22 and 24. The latch assemblies 22 and 24 then move springably from the unlatched position to the latched position to secure the portable computing device 12 to the attachable expansion device 14.

In a docked configuration, the multistage undocking assembly 16 facilitates a smooth unlatching and separation of the portable computing device 12 from the attachable expansion device 14. In a first undocking stage, the user presses the triggers 26 to engage the device separation mechanism 28, which moves the latch assemblies 22 and 24 outwardly from the latched position to the unlatched position. In the unlatched position following the first undocking stage, the portable computing device 12 is unlatched and free to separate from the attachable expansion device 14. In one embodiment, the device separation mechanism 28 releases the spring-loaded lifters 30 and 32 in a second undocking stage. In another embodiment, the device separation mechanism 28 releases the spring-loaded lifters 30 and 32 in the first undocking stage. In either embodiment, the spring force of the spring-loaded lifters 30 and 32 is insufficient to effectuate a separation of the portable computing device 12 from the attachable expansion device 14. For example, the spring force is less than the combined weight of the portable computing device 12, the frictional forces between connectors (e.g., the mated communication ports), and so forth.

In a second undocking stage, the user continues pressing the triggers 26 to engage the device separation mechanism 28, which then engages the manually forced lifters 34 and 36. The device separation mechanism 28 uses the force exerted by the user to lift the manually forced lifters 34 and 36 from an unlifted state to a lifted state, thereby providing the lifting force to separate the portable computing device 12 from the attachable expansion device 14. Accordingly, the manually forced lifters 34 and 36 overcome any frictional or compressive force between mated connectors and communication ports. The spring-loaded lifters 30 and 32 also complement the manual force provided by the manually forced lifters 34 and 36 during the second undocking stage. At the end of the second undocking stage, the spring-loaded lifters 30 and 32 springably support the portable computing device 12 in the lifted position.

Figure 3:
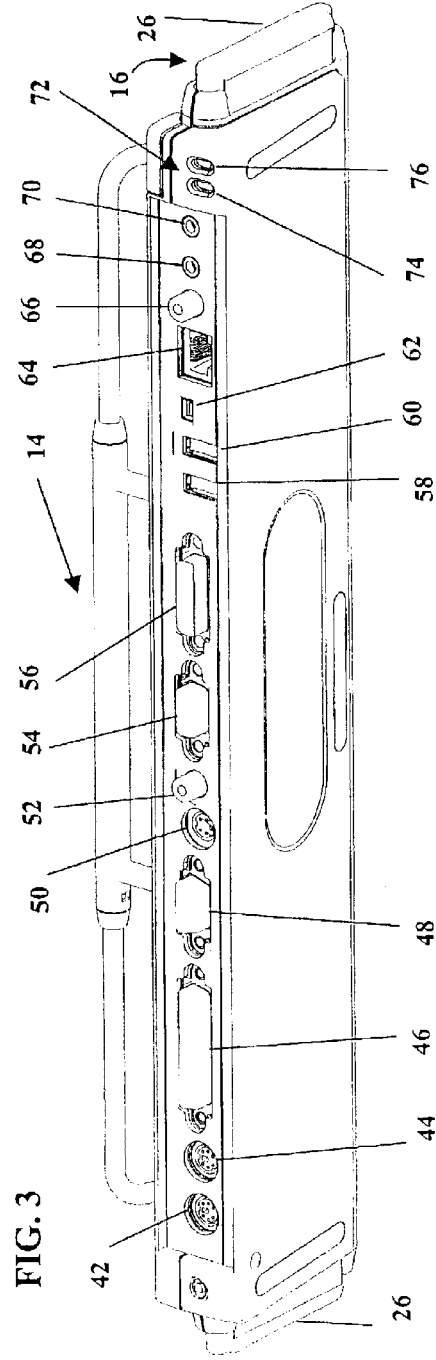
FIG. 3 is a front perspective view of the attachable expansion device of FIG. 1.

As illustrated in FIG. 3, the attachable expansion device 14 comprises a variety of expansion ports, such as input/output ports 42–70. These expansion ports 42–70 may comprise PS/2 ports, parallel ports, serial ports, monitor ports, audio/video ports, USB ports, wireless ports, optical ports, modem ports, network ports, or any other desired communication ports. The attachable expansion device 14 also may include a security mechanism 72, such as lock ports 74 and 76, which may be coupled to a desired fixture. In an exemplary embodiment, the security mechanism 72 is operably coupled to the multistage undocking assembly 16 to facilitate additional security between the portable computing device 12 and the attachable expansion device 14. For example, one of the lock ports 74 and 76 may have a lockdown mechanism coupled to the multistage undocking assembly 16, such that engagement with the respective port secures the multistage undocking assembly 16 in a docked configuration. As discussed above, the attachable expansion device 14 also may comprise a variety of expansion components and circuitry. For example, the attachable expansion device 14 may include a processor, memory, a disk drive, a network card, a modem, a wireless communication card, and so forth.

As illustrated in FIGS. 4 and 5, the multistage undocking assembly 16 has engagement assemblies 78 and 80 to facilitate the unlatching and separation of the portable computing device 12 from the attachable expansion device 14 in multiple stages. The triggers 26 are operably coupled to the mechanical attachment assembly 20 and the device separation mechanism 28 via the engagement assemblies 78 and 80. In operation, the user presses triggers 26 to move the engagement assemblies 78 and 80 laterally inward through the attachable expansion device 14. The engagement assemblies 78 and 80 include latch release members 82 and 84 to release the latch assemblies 24 and 22, respectively. Upon release, the latch assemblies 22 and 24 move to a non-obstructing position relative to the spring-loaded lifters 30 and 32, which are then springably forced upward via spring assemblies 86 and 88, respectively. The spring assemblies 86 and 88 may use any suitable spring having a spring force selected to support the weight of the portable computing device 12. Yet, the spring force may be insufficient to overcome retaining forces holding the portable computing device 12 to the attachable expansion device 14. The spring assemblies 86 and 88 also may have spring force adjustment mechanism, which allow a closer match of the spring force to the weight of the particular portable computing device 12. The spring force adjustment mechanism also may comprise an automatic weight analysis mechanism, which facilitates an automatic spring adjustment based on the weight of the portable computing device 12.

The engagement assemblies 78 and 80 of FIGS. 4 and 5 also include manual engagement members 90 and 92, which interact with mating engagement members 94 and 96 of the manually forced lifters 36 and 34, respectively. As illustrated, the engagement members 90 and 94 interact at wedge-shaped or cam-shaped interaction surfaces 98, while the engagement members 92 and 96 interact at wedge-shaped or cam-shaped interaction surfaces 100. In operation, the wedge-shaped or cam-shaped interaction surfaces 98 and 100 force the lifters 36 and 34 to rise upward in a lifting motion as the user applies a manual force against the triggers 26 and the engagement assemblies 78 and 80, respectively. Upon release of the triggers 26, return springs 102 and 104 force the manually forced lifters 36 and 34 respectively back to unlifted positions.

Figure 6:
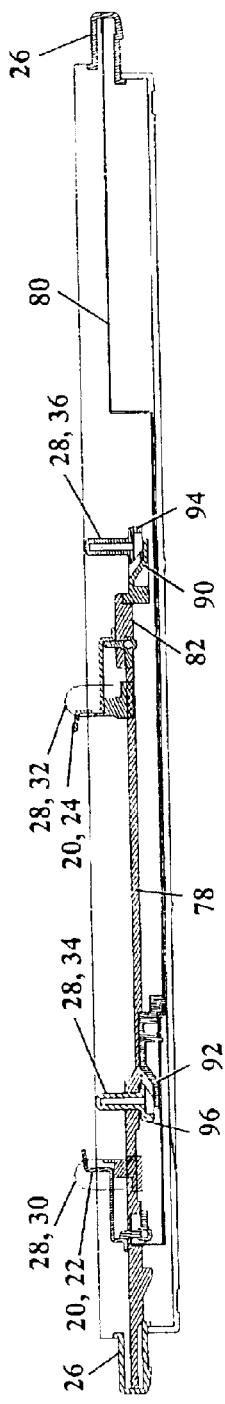
FIGS. 6–8 are partial cross-sectional side views of the attachable expansion device of FIGS. 1–5 illustrating stages of the multistage undocking assembly.
Figure 7:
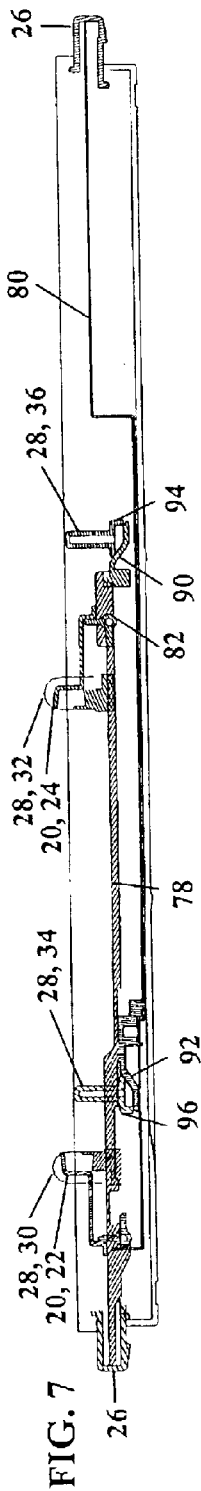
Figure 8:
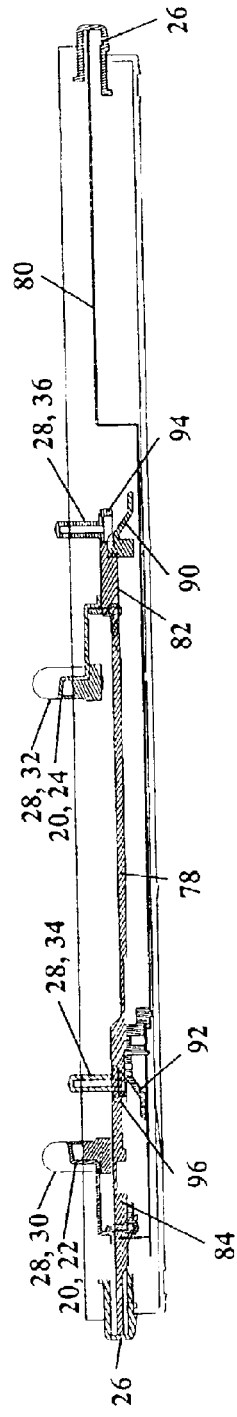

The multiple stages of the multistage undocking assembly 16 are further illustrated with reference to FIGS. 6–8. As illustrated in FIG. 6, the latch assemblies 22 and 24 are disposed in latched positions, while the spring-loaded lifters 30 and 32 and the manually forced lifters 34 and 36 are disposed in unlifted positions. In the illustrated docked configuration, the portable computing device 12 is mechanically and communicatively coupled to the attachable expansion device 14.

As the user presses the triggers 26 in the first undocking stage, the engagement assemblies 78 and 80 move the latch assemblies 24 and 22 to unlatched positions via movement of latch release members 82 and 84, respectively. FIG. 7 illustrates an unlatched configuration of the attachable expansion device 14 at the end of the first undocking stage. As illustrated, the latch assemblies 22 and 24 are disposed in the unlatched positions, while the spring-loaded lifters 30 and 32 and the manually forced lifters 34 and 36 remain in the unlifted positions. In this exemplary embodiment, the spring force of the spring assemblies 86 and 88 is insufficient to overcome the combined weight of the portable computing device 12 and the retaining forces (e.g., friction) between the portable computing device 12 and the attachable expansion device 14. Accordingly, the portable computing device 12 remains seated on the attachable expansion device 14 after being unlatched in the first undocking stage.

As the user continues pressing the triggers 26 from the first undocking stage to the second undocking stage, the engagement assemblies 78 and 80 move the manually forced lifters 36 and 34 to lifted positions via movement of manual engagement members 90 and 92 against mating engagement members 94 and 96, respectively. In the process of raising lifters 34 and 36, the spring-loaded lifters 30 and 32 also rise to lifted positions. Again, the spring-loaded lifters 30 and 32 may have insufficient spring force to lift the portable computing device 12 without the manually forced lifters 34 and 36. However, spring-loaded lifters 30 and 32 complement the manual lifting force provided by the manually forced lifters 34 and 36. Together, the spring-loaded lifters 30 and 32 and the manually forced lifters 34 and 36 provide a separation force sufficient to separate the portable computing device 12 from the attachable expansion device 14. FIG. 8 illustrates an unlatched and lifted configuration of the attachable expansion device 14 at the end of the second undocking stage. As illustrated, the latch assemblies 22 and 24 are disposed in the unlatched positions, while the spring-loaded lifters 30 and 32 and the manually forced lifters 34 and 36 are disposed in lifted positions via a spring force and a manual force, respectively. Upon separation of the portable computing device 12 from the attachable expansion device 14, the user disengages the triggers 26 and the associated engagement assemblies 78 and 80. In this exemplary embodiment, the multistage undocking assembly 16 returns the manually forced lifters 34 and 36 to the unlifted positions, while the spring-forced lifters 30 and 32 remain in the lifted positions. Accordingly, the spring-loaded lifters 30 and 32 support the portable computing device 12 in the lifted positions.

As described in detail above, the multistage undocking assembly 16 provides a relatively smooth undocking motion, which avoids abrupt and noisy undocking of the portable computing device 12 from the attachable expansion device 14. The application of the manually forced lifters 34 and 36 reduces the requisite spring force needed by the spring-loaded lifters 30 and 32, thereby reducing friction and abrupt eject motions in the undocking assembly. Although specific latch and lifter mechanisms are illustrated in the foregoing figures, any suitable latch and lifter mechanisms are within the scope of the present technique. For example, the lifter mechanism may comprises pop-up ejectors, hinged separation members, twisting or threaded lifters, or any other suitable mechanism for ejecting, lifting, or generally separating the portable computing device 12 from the attachable expansion device 14. Moreover, multistage undocking assembly may be disposed in the portable computing device 12 and/or the attachable expansion device 14.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims. For example, the foregoing multistage undocking mechanisms are applicable to a variety of docking attachment/release mechanisms, portable computers, docking stations, port replicators, and other devices.

What is claimed is:

1. A computer system, comprising:
   a portable computing device having a first communication connector and a first mechanical connector mechanism; and a dockable expansion base comprising:
  second communication connector that is mateable with the first communication connector;
  second mechanical connector mechanism that is coupleable with the first mechanical connector mechanism; and
  an undocking mechanism comprising a trigger operably coupled to the second mechanical connector mechanism in a first engagement position and operably coupled to a manually forced lifter mechanism in a second engagement position, wherein the manually forced lifter mechanism comprises multiple lifters operably coupled with a lateral engagement mechanism extending through the dockable expansion base and operably coupled to the trigger.

2. The computer system of claim 1, wherein the undocking mechanism comprises a spring-loaded lifter mechanism operable in the second engagement position.

3. The computer system of claim 2, wherein the spring-loaded lifter mechanism comprises a spring assembly having a spring force approximately equal to the weight of the portable computing device.

4. The computer system of claim 2, wherein the spring-loaded lifter mechanism comprises a spring assembly having a spring force less than the sum of the weight of the portable computing device and a friction force between the first and second communication connectors.

5. The computer system of claim 1, wherein the second mechanical connector mechanism comprises a plurality of latches releasable in the first engagement position and, wherein the undocking mechanism comprises a spring-loaded lifter mechanism disposed adjacent each of the plurality of latches.

6. The computer system of claim 1, wherein the manually forced lifter mechanism is adapted to overcome a friction force between the first and second communication connectors.

7. The computer system of claim 1, wherein the manually forced lifter mechanism is adapted to provide a lift force greater than the weight of the portable computing device plus a retaining force between the portable computing device and the dockable expansion base less a lifting spring force between the portable computing device and the dockable expansion base.

8. The computer system of claim 1, wherein the trigger comprises buttons disposed at opposite sides of the dockable expansion base.

9. The computer system of claim 1, wherein the portable computing device comprises a laptop computer.

10. The computer system of claim 1, wherein the portable computing device comprises a tablet computer.

11. The computer system of claim 1, wherein the expansion base comprise a plurality of input/output ports.

12. The computer system of claim 11, wherein the expansion base comprises a plurality of computing components.

13. A computer system, comprising:
a portable computing device having a first communication connector and a first mechanical connector mechanism; and
a dockable expansion base comprising:
  a second communication connector that is mateable with the first communication connector;
  a second mechanical connector mechanism that is coupleable with the first mechanical connector mechanism; and
  an undocking mechanism comprising a trigger operably coupled to the second mechanical connector mechanism in a first engagement position and operably coupled to a manually forced lifter mechanism in a second engagement position, wherein the undocking mechanism comprises a spring-loaded lifter mechanism operable in the second engagement position, wherein the spring-loaded lifter mechanism comprises a spring force adjuster.

14. The computer system of claim 13, wherein the spring force adjuster comprises an automatic weight adjuster adapted to accommodate the weight of the portable computing device.

15. A computer system, comprising:
a computing device;
a dockable device; and
a multistage undocking mechanism disposed in at least one of the computing device and the dockable device, comprising:
  a trigger;
  a docking connector releasable by the trigger; and
  a device separation mechanism comprising an automatically engageable lifter and a manually forced lifter, wherein the docking connector retains the automatically engageable lifter in a secured position at which the docking connector secures the computing device to the dockable device, and the automatically engageable lifter is enabled in a released position at which the docking connector releases the computing device from the dockable device.

16. The computer system of claim 15, wherein the trigger is a manual button.

17. The computer system of claim 15, wherein the docking connector comprises a latch.

18. The computer system of claim 15, wherein the docking connector is releasable in a first stage and the manually forced lifter is operable in a second stage.

19. The computer system of claim 15, wherein the automatically engageable lifter and the manually forced lifter are adapted to provide a joint separation force sufficient to separate the computing device from the docking device.

20. The computer system of claim 15, wherein the automatically engageable lifter comprises a spring-loaded lifter mechanism.

21. The computer system of claim 20, wherein the spring-loaded lifter mechanism comprises a spring having a spring force substantially equal to the weight of the computing device.

22. The computer system of claim 15, wherein the manually forced lifter is adapted to overcome a retaining force between the computing device and the docking device.

23. A computer system, comprising:
a multistage undocking mechanism adapted to undock a computing device from a dockable device, comprising:
  a manual trigger comprising a left-hand button coupled to a first lateral engagement mechanism and a right-hand button coupled to a second lateral engagement mechanism;
  a releasable docking connector coupled to at least one of the first and second lateral engagement mechanisms; and
  a device separation mechanism comprising an automatically engageable lifter and a manually forced lifter, wherein the manually forced lifter is coupled to at least one of the first and second lateral engagement mechanisms.

24. The computer system of claim 23, wherein the releasable docking connector comprises a latch.

25. The computer system of claim 23, wherein the releasable docking connector is releasable in a position of the manual trigger and the manually forced lifter is operable in a positional range after the position of the manual trigger.

26. The computer system of claim 25, wherein the automatically engageable lifter is operable after the position.

27. The computer system of claim 23, wherein the automatically engageable lifter comprises a spring-loaded lifter adapted to support weight of the computer device after being disconnected from the dockable device.

28. The computer system of claim 23, wherein the releasable docking connector comprises a first latch coupled to the first lateral engagement mechanism and a second latch coupled to the second lateral engagement mechanism.

29. The computer system of claim 23, wherein the manually forced lifter comprises a first lifter coupled to the first lateral engagement mechanism and a second lifter coupled to the second lateral engagement mechanism.

30. The computer system of claim 23, wherein the automatically engageable lifter comprises a first spring-loaded lifter that is freed by the first lateral engagement mechanism and a second spring-loaded lifter that is freed by the second lateral engagement mechanism.

* * * * *